US012589365B2

(12) United States Patent
Niu

(10) Patent No.: US 12,589,365 B2
(45) Date of Patent: Mar. 31, 2026

(54) SOLUTION PREPARATION DEVICE, AND SOLUTION REPLACEMENT SYSTEM AND METHOD

(71) Applicant: Enpeng Niu, Beijing (CN)

(72) Inventor: Enpeng Niu, Beijing (CN)

( * ) Notice: Subject to any disclaimer, the term of this patent is extended or adjusted under 35 U.S.C. 154(b) by 814 days.

(21) Appl. No.: 17/496,763

(22) Filed: Oct. 8, 2021

(65) Prior Publication Data

US 2022/0023806 A1    Jan. 27, 2022

Related U.S. Application Data

(63) Continuation of application No. PCT/CN2020/083204, filed on Apr. 3, 2020.

(30) Foreign Application Priority Data

Apr. 9, 2019    (CN) .......................... 201910281456.2

(51) Int. Cl.
  B01F 21/00        (2022.01)
  B01F 27/90        (2022.01)
        (Continued)
(52) U.S. Cl.
  CPC .............. B01F 21/30 (2022.01); B01F 27/90 (2022.01); B01F 35/712 (2022.01);
        (Continued)
(58) Field of Classification Search
  CPC .......... B01F 21/00; B01F 21/02; B01F 21/30; B01F 35/82; B01F 35/754251; B01F 35/79; A01K 63/04
  See application file for complete search history.

(56) References Cited

U.S. PATENT DOCUMENTS 1,173,671 A  *  2/1916  McKinlay ................. B07B 1/00
                                                        209/350
1,454,916 A  *  5/1923  Arbuckle .................. B07B 1/06
                                                        210/513
        (Continued)

FOREIGN PATENT DOCUMENTS

CN         201442722 U      4/2010
CN         202527086 U     11/2012
        (Continued)

OTHER PUBLICATIONS

English translation of DE 3932400A1, Wirth, Apr. 11, 1991, translation obtained Jul. 11, 2024 from <https://worldwide.espacenet.com/> (Year: 2024).*

(Continued)

*Primary Examiner* — Claire X Wang
*Assistant Examiner* — Patrick M McCarty
(74) *Attorney, Agent, or Firm* — Westbridge IP LLC

(57)        ABSTRACT

Disclosed are a solution preparation device, a solution replacement system and a solution replacement method. The solution preparation device comprises a liquid container, a powder container, an upper cover and a controller; the liquid container is provided with a detection element for detecting a specific parameter of a solution; the powder container is arranged above the liquid container, and the upper cover covers a top end of the powder container to form a material holding cavity for placing a powder, a bottom end of the powder container is provided with a material discharge port through which the powder in the material holding cavity enters the liquid container. The solution preparation device further comprises a stopper for blocking the material discharge port, the controller controls the stopper according to the specific parameter to realize opening and closing of the material discharge port.

16 Claims, 4 Drawing Sheets

(51) Int. Cl.

| | |
|---|---|
| *B01F 35/71* | (2022.01) |
| *B01F 35/75* | (2022.01) |
| *B01F 35/80* | (2022.01) |
| *B01F 35/82* | (2022.01) |
| *B01F 35/83* | (2022.01) |
| *B01F 35/90* | (2022.01) |
| *A01K 63/04* | (2006.01) |

(52) U.S. Cl.
CPC ........ *B01F 35/714* (2022.01); *B01F 35/7173* (2022.01); *B01F 35/7176* (2022.01); *B01F 35/71805* (2022.01); *B01F 35/7544* (2022.01); *B01F 35/7547* (2022.01); *B01F 35/82* (2022.01); *B01F 35/831* (2022.01); *B01F 35/892* (2022.01); *B01F 35/90* (2022.01); *A01K 63/04* (2013.01)

(56) References Cited

U.S. PATENT DOCUMENTS

| | | | | | |
|---|---|---|---|---|---|
| 3,581,938 | A | * | 6/1971 | Hartz | B65D 88/64 |
| | | | | | 222/196 |
| 3,837,914 | A | * | 9/1974 | Cadeo | B01F 25/25 |
| | | | | | 127/63 |
| 4,141,656 | A | * | 2/1979 | Mian | B01F 21/10 |
| | | | | | 366/160.3 |
| 4,252,139 | A | * | 2/1981 | Davis | D06B 23/205 |
| | | | | | 222/64 |
| 4,325,849 | A | * | 4/1982 | Rosen | B28B 17/02 |
| | | | | | 366/186 |
| 4,341,639 | A | * | 7/1982 | Santora | C02F 1/465 |
| | | | | | 210/769 |
| 4,470,525 | A | * | 9/1984 | Daw | B65D 88/66 |
| | | | | | 222/200 |
| 4,782,790 | A | * | 11/1988 | Batson | A01K 5/0291 |
| | | | | | 119/51.11 |
| 5,319,946 | A | * | 6/1994 | Manificat | B24C 1/083 |
| | | | | | 451/39 |
| 5,407,975 | A | * | 4/1995 | Pardikes | C02F 1/5227 |
| | | | | | 528/499 |
| 5,561,880 | A | * | 10/1996 | Allen | D06F 73/02 |
| | | | | | 223/51 |
| 5,567,048 | A | * | 10/1996 | Hammonds | C02F 1/687 |
| | | | | | 222/105 |
| 5,637,230 | A | * | 6/1997 | Billings | C02F 1/688 |
| | | | | | 210/744 |
| 5,647,272 | A | * | 7/1997 | Paramest | A47J 43/284 |
| | | | | | 210/474 |
| 5,775,803 | A | * | 7/1998 | Montgomery | B01F 35/8311 |
| | | | | | 366/152.2 |
| 5,972,223 | A | * | 10/1999 | Jonsson | B01F 23/59 |
| | | | | | 210/417 |
| 6,163,976 | A | * | 12/2000 | Tada | F26B 5/041 |
| | | | | | 34/92 |
| 6,203,183 | B1 | * | 3/2001 | Mordaunt | B05B 12/1418 |
| | | | | | 366/182.4 |
| 6,244,219 | B1 | * | 6/2001 | Krum | A01K 63/04 |
| | | | | | 119/268 |
| 2004/0027914 | A1 | * | 2/2004 | Vrane | B01F 35/32 |
| | | | | | 366/213 |
| 2006/0086669 | A1 | | 4/2006 | Jack et al. | |
| 2007/0178529 | A1 | * | 8/2007 | Breidford | F16K 15/1825 |
| | | | | | 435/7.1 |
| 2007/0297281 | A1 | * | 12/2007 | Saunders | A47J 43/044 |
| | | | | | 366/601 |

| | | | | | |
|---|---|---|---|---|---|
| 2010/0006513 | A1 | * | 1/2010 | Fishler | B01F 25/32 |
| | | | | | 210/753 |
| 2010/0086445 | A1 | * | 4/2010 | Sims | B01F 21/22 |
| | | | | | 239/10 |
| 2011/0110179 | A1 | * | 5/2011 | Richards | G05D 11/139 |
| | | | | | 366/152.2 |
| 2012/0138544 | A1 | * | 6/2012 | Barani | B01F 21/22 |
| | | | | | 210/744 |
| 2013/0235691 | A1 | * | 9/2013 | Volker | B01F 25/53 |
| | | | | | 366/132 |
| 2013/0286767 | A1 | * | 10/2013 | Gaultney | B01F 21/20 |
| | | | | | 366/152.2 |
| 2013/0316460 | A1 | * | 11/2013 | Kim | G01N 33/1826 |
| | | | | | 422/63 |
| 2014/0269153 | A1 | * | 9/2014 | Wells | B01F 21/20 |
| | | | | | 366/150.1 |
| 2015/0132197 | A1 | * | 5/2015 | Ferguson | B01F 21/22 |
| | | | | | 422/266 |
| 2015/0198550 | A1 | * | 7/2015 | Spry | G01N 25/00 |
| | | | | | 422/119 |
| 2016/0195287 | A1 | * | 7/2016 | Shirali | F24F 11/63 |
| | | | | | 700/282 |
| 2019/0060850 | A1 | * | 2/2019 | Gillespie | B01F 35/2134 |
| 2019/0151808 | A1 | * | 5/2019 | Giardullo | B01F 23/2361 |
| 2019/0358386 | A1 | * | 11/2019 | Eyrard | B01F 21/10 |
| 2020/0299938 | A1 | * | 9/2020 | Murray | F16L 55/42 |
| 2021/0370248 | A1 | * | 12/2021 | Gros | A45D 34/00 |

FOREIGN PATENT DOCUMENTS

| | | | | | |
|---|---|---|---|---|---|
| CN | 203369230 | U | * | 1/2014 | |
| CN | 204329335 | U | * | 5/2015 | |
| CN | 104764188 | A | * | 7/2015 | |
| CN | 105222353 | A | * | 1/2016 | |
| CN | 106422879 | A | | 2/2017 | |
| CN | 106855301 | A | * | 6/2017 | F24H 1/00 |
| CN | 206762675 | U | | 12/2017 | |
| CN | 206980492 | U | | 2/2018 | |
| CN | 108607464 | A | | 10/2018 | |
| CN | 109569403 | A | | 4/2019 | |
| CN | 109894009 | A | | 6/2019 | |
| DE | 2923672 | A1 | | 12/1980 | |
| DE | 3515379 | A1 | * | 11/1986 | |
| DE | 3932400 | A1 | | 4/1991 | |
| EP | 0201777 | A2 | | 11/1986 | |
| JP | 2017189731 | A | | 10/2017 | |
| KR | 20140006048 | U | * | 12/2014 | F01N 3/24 |
| WO | 2008015678 | A2 | | 2/2008 | |
| WO | 2011130336 | A1 | | 10/2011 | |
| WO | 2012033747 | A1 | | 3/2012 | |

OTHER PUBLICATIONS

English translation of CN 109569403, Xiao et al., Apr. 5, 2019, translation obtained Jul. 12, 2024 from < https://patents.google.com/> (Year: 2024).*

English translation of DE 2923672A1, Reh et al., Dec. 18, 1980, translation obtained Dec. 20, 2024 from <https://worldwide.espacenet.com/> (Year: 2024).*

First Office Action issued in counterpart Chinese Patent Application No. 201910281456.2, dated Mar. 26, 2021.

International Search Report issued in corresponding PCT Application No. PCT/CN2020/083204, dated Jul. 2, 2020.

Written Opinion issued in corresponding PCT Application No. PCT/CN2020/083204, dated Jul. 2, 2020.

Extended European Search Report issued in counterpart European Patent Application No. 20787536.0, dated Dec. 2, 2022.

* cited by examiner

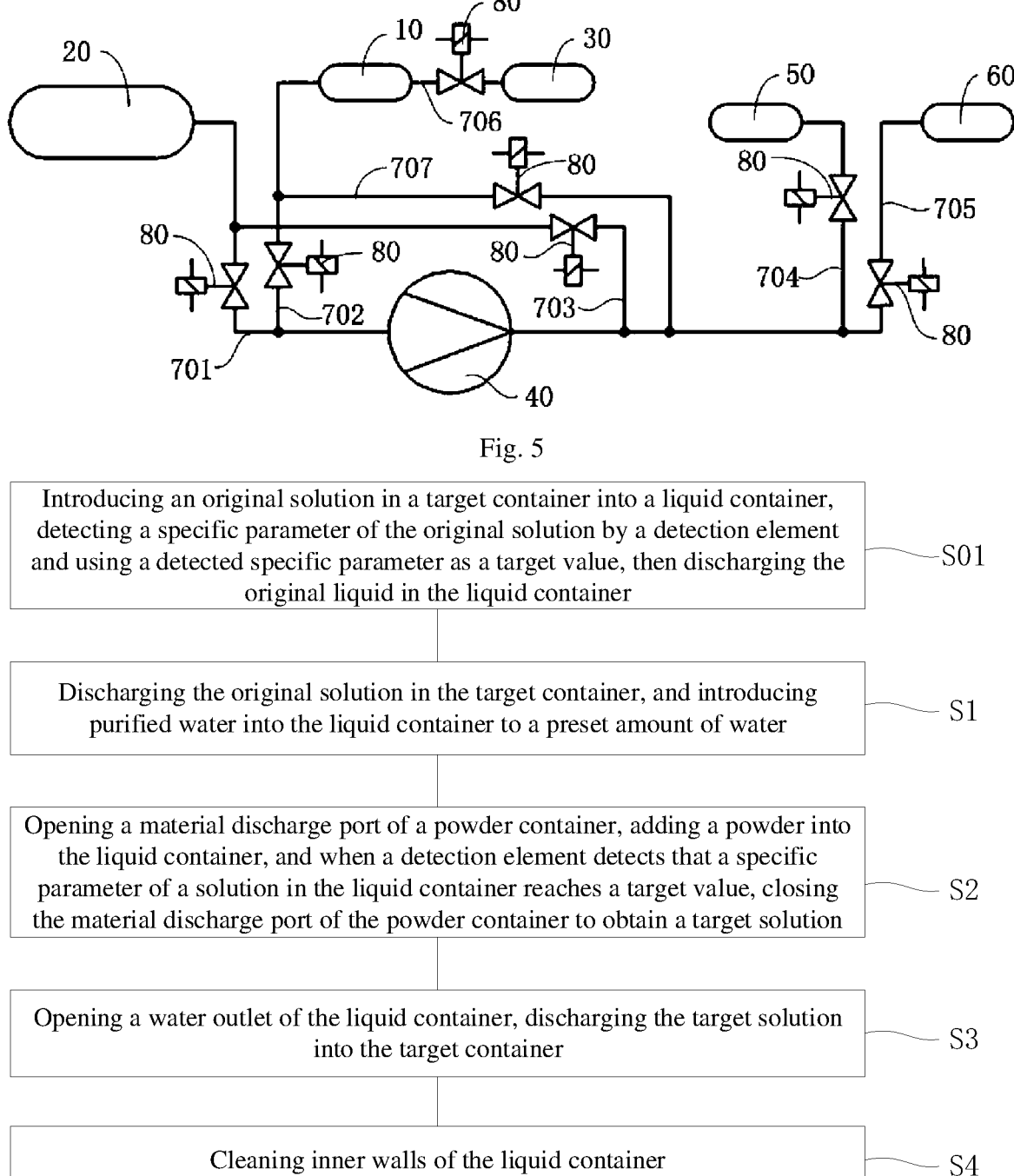

Fig. 5

| Introducing an original solution in a target container into a liquid container, detecting a specific parameter of the original solution by a detection element and using a detected specific parameter as a target value, then discharging the original liquid in the liquid container | S01 |

| Discharging the original solution in the target container, and introducing purified water into the liquid container to a preset amount of water | S1 |

| Opening a material discharge port of a powder container, adding a powder into the liquid container, and when a detection element detects that a specific parameter of a solution in the liquid container reaches a target value, closing the material discharge port of the powder container to obtain a target solution | S2 |

| Opening a water outlet of the liquid container, discharging the target solution into the target container | S3 |

| Cleaning inner walls of the liquid container | S4 |

Fig. 6

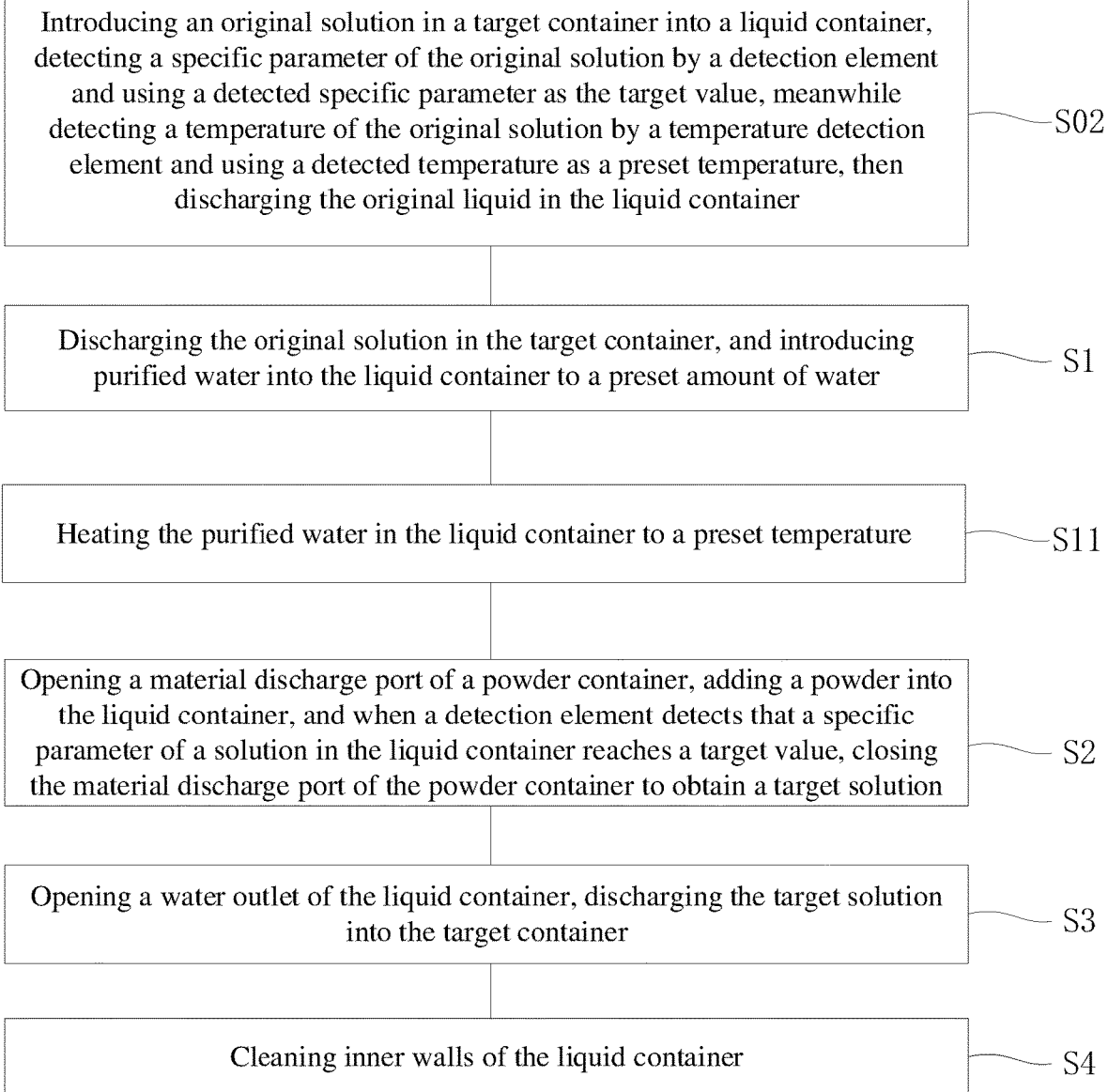

Introducing an original solution in a target container into a liquid container, detecting a specific parameter of the original solution by a detection element and using a detected specific parameter as the target value, meanwhile detecting a temperature of the original solution by a temperature detection element and using a detected temperature as a preset temperature, then discharging the original liquid in the liquid container — S02

Discharging the original solution in the target container, and introducing purified water into the liquid container to a preset amount of water — S1

Heating the purified water in the liquid container to a preset temperature — S11

Opening a material discharge port of a powder container, adding a powder into the liquid container, and when a detection element detects that a specific parameter of a solution in the liquid container reaches a target value, closing the material discharge port of the powder container to obtain a target solution — S2

Opening a water outlet of the liquid container, discharging the target solution into the target container — S3

Cleaning inner walls of the liquid container — S4

Fig. 7

SOLUTION PREPARATION DEVICE, AND SOLUTION REPLACEMENT SYSTEM AND METHOD

CROSS-REFERENCE TO RELATED APPLICATIONS

This application is a continuation of PCT application No. PCT/CN2020/083204 filed on Apr. 3, 2020, which claims priority to Chinese Patent Application No. 201910281456.2, filed on Apr. 9, 2019. The disclosures of the aforementioned applications are hereby incorporated by reference in their entireties.

TECHNICAL FIELD

The present application relates to the technical field of solution preparation, in particular to a solution preparation device, a solution replacement system and a solution replacement method.

BACKGROUND

In the breeding of marine fish, brackish fish, corals and Sanhu cichlids in households, businesses and aquariums, it is necessary to use pre-prepared compound salt and purified water to prepare a solution having a specific proportion so as to simulate seawater or lake water as a breeding environment. It is required to add a salt solution, such as calcium chloride, magnesium chloride or lanthanum chloride, and powdered coral food suspension into the water.

At present, there is no equipment on the market that can automatically prepare solution/suspension. The breeder should manually add salt to the water and measure the proportion with a hydrometer, and add salt or water again according to the measured result to adjust the proportion. Only after several repetitions, the solution having the specific proportion can be prepared. This solution preparation method is time-consuming and labor-intensive and is of low accuracy.

Therefore, it is a technical problem to be solved by those skilled in the art to simplify manual operations, improve efficiency and precision in the process of solution preparation so as to improve efficiency of liquid replacement in a target container.

SUMMARY

The objective of the present application is to provide a solution preparation device, a solution replacement system and a solution replacement method, which can simplify manual operations, improve efficiency and precision in the process of solution preparation so as to improve efficiency of liquid replacement in a target container.

In order to solve the above technical problems, the present application provides a solution preparation device, which includes a liquid container, a powder container, an upper cover and a controller. The liquid container is provided with a detection element for detecting a specific parameter of a solution; the powder container is arranged above the liquid container, the upper cover covers a top end of the powder container to form a material holding cavity for placing a powder, a bottom end of the powder container is provided with a material discharge port through which the powder in the material holding cavity enters the liquid container. The solution preparation device further comprises a stopper for blocking the material discharge port, the controller controls the stopper according to the specific parameter to realize opening and closing of the material discharge port.

In detail, the solution preparation device in this embodiment is used to prepare a solution with a specific parameter as a target value (hereinafter referred to as "target solution"). Specifically, when the solution is prepared, after the liquid container is filled with purified water, the controller controls the stopper to move away from the material discharge port, that is, the material discharge port is opened. At this time, the material holding cavity is communicated with the liquid container, and the powder in the material holding cavity can be discharged under the action of gravity, and falls into the liquid container and dissolves in water. At the same time, the detection element detects the specific parameter of the solution in the liquid container in real time. The controller monitors the specific parameter in real time and controls the stopper to move to block the material discharge port so as to close the material discharge port when the specific parameter reaches the target value. The preparation of the target solution is completed.

Here, the target solution refers to a solution whose specific parameter reaches the target value. Specifically, the target solution has different specific parameters and target values according to different usage conditions, which is not limited herein. The detection element can implement direct measurement or indirect measurement according to the specific parameters. For example in this embodiment, if the solution preparation device is used to prepare the target solution used in an aquarium, the concentration and the proportion of the target solution must reach the target values, the detection element may be an element that can directly detect the concentration and the proportion of the solution, and the controller directly controls the opening and closing of the material discharge port according to the specific parameters detected by the detection element. Or, the detection element can be a conductivity detection element. In this case, because the proportion of the solution is related to the conductivity (non-linear correlation, and for different powders, the relationship between proportion and conductivity is also different, it needs to be determined and calculated according to the corresponding relationship stored in the controller), the controller can calculate the proportion of the solution according to the conductivity of the solution, and decide whether to continue adding powder or water until the specific parameter reaches the target value.

The solution preparation device has a simple structure and can realize automatic solution preparation without frequent manual operations. While reducing manual operations and material resources, the preparation time is reduced, the efficiency and the accuracy of preparation are improved, and the efficiency of liquid replacement in the target container is improved.

Optionally, a stirring part is further provided in the material holding cavity for stirring the powder in the material holding cavity.

Optionally, the upper cover is provided with a telescopic part, the stopper is provided at a bottom end of the telescopic part, and the stirring part is provided at a lower part of the telescopic part.

Optionally, the stirring part comprises a multi-layer screen arranged along a length direction of the telescopic part.

Optionally, a moving track of the stopper is parallel to an axis of the material discharge port, and the stopper is provided with a downwardly tapered elastic tapered plug.

3

Optionally, an angle between a moving track of the stopper and an axis of the material discharge port is greater than 0° and less than or equal to 90°.

Optionally, a drying part is provided in the material holding cavity.

Optionally, a bottom wall of the powder container is a tapered surface that tapers downwards, and a cone angle of the tapered surface is not greater than 130°.

Optionally, the liquid container is provided with a first level gauge and a second level gauge. The first liquid level gauge is arranged at the highest water level line in the liquid container; and the second liquid level gauge is arranged at the lowest water level line in the liquid container.

Optionally, the liquid container is provided with a heating device and a temperature sensor.

Optionally, the liquid container is provided with a flow pump, and a discharging pump is provided at a water outlet of the liquid container.

Optionally, a power supply socket is further provided at an outside of the upper cover, and the controller controls turning on and turning off of the power supply socket.

Optionally, the liquid container is provided with a flow meter, and when the flow meter detects an amount of water entering the liquid container reaches a preset amount of water, the controller controls a water inlet of the liquid container to close.

In addition, the present application provides a solution replacement system, comprising a target container, a water source, a water pump, a sewage treatment device, a washing device and the solution preparation device described above. An upstream of the water pump is communicated with the target container and a water outlet of the liquid container of the solution preparation device through a first pipeline and a second pipeline, respectively. A downstream of the water pump is communicated with the target container, the sewage treatment device and the washing device through a third pipeline, a fourth pipeline and a fifth pipeline, respectively. The water source is communicated with the liquid container through a sixth pipeline; each pipeline is respectively provided with a solenoid valve.

Optionally, the downstream of the water pump is communicated with a water inlet of the liquid container through a seventh pipeline, and the seventh pipeline is provided with a solenoid valve.

In addition, the present application provides a solution replacement method, comprising the following steps:

S1: discharging an original solution in a target container, and introducing purified water into a liquid container to a preset amount of water;

S2: opening a material discharge port of a powder container, adding a powder into the liquid container, and when a detection element detects that a specific parameter of a solution in the liquid container reaches a target value, closing the material discharge port of the powder container to obtain a target solution;

S3: opening a water outlet of the liquid container, discharging the target solution into the target container; and S4: cleaning inner walls of the liquid container.

Optionally, the method further comprises Step S01 before Step S1: introducing the original solution in the target container into the liquid container, detecting a specific parameter of the original solution by a detection element and using a detected specific parameter as the target value, then discharging the original liquid in the liquid container.

Optionally, the method further comprises Step S11 between Step S1 and Step S2: heating the purified water in the liquid container to a preset temperature.

Optionally, the method further comprises Step S02 before Step S1: introducing the original solution in the target container into the liquid container, detecting a specific parameter of the original solution by a detection element and using a detected specific parameter as the target value, meanwhile detecting a temperature of the original solution by a temperature detection element and using a detected temperature as a preset temperature, then discharging the original liquid in the liquid container.

Optionally, Step S4 comprises:

S41: introducing purified water into the liquid container, and keeping the water in the liquid container flowing for at least 10 minutes;

S42: discharging the water in the liquid container;

S43: introducing purified water into the liquid container, and introducing the purified water in the liquid container into a washing device;

S44: discharging the water in the liquid container after the washing device washes inner walls of the liquid container; and S45: repeating Steps S41-S44 at least twice.

The technical effects of the above-mentioned solution replacement system and the above-mentioned solution replacement method are similar to those of the above-mentioned solution preparation device, and will not be repeated herein to avoid redundancy.

BRIEF DESCRIPTION OF DRAWINGS

FIG. 5 is a schematic structural diagram of a solution replacement system according to an embodiment of the present application.

FIG. 6 is a block diagram of a solution replacement method according to an embodiment of the present application.

FIG. 7 is a detailed block diagram of a solution replacement method according to an embodiment of the present application.

DETAILED DESCRIPTION OF THE EMBODIMENTS

In order to enable those skilled in the art to better understand the technical solutions of the present application, the present application will be further described in detail below with reference to the accompanying drawings and specific embodiments.

Figure 1:
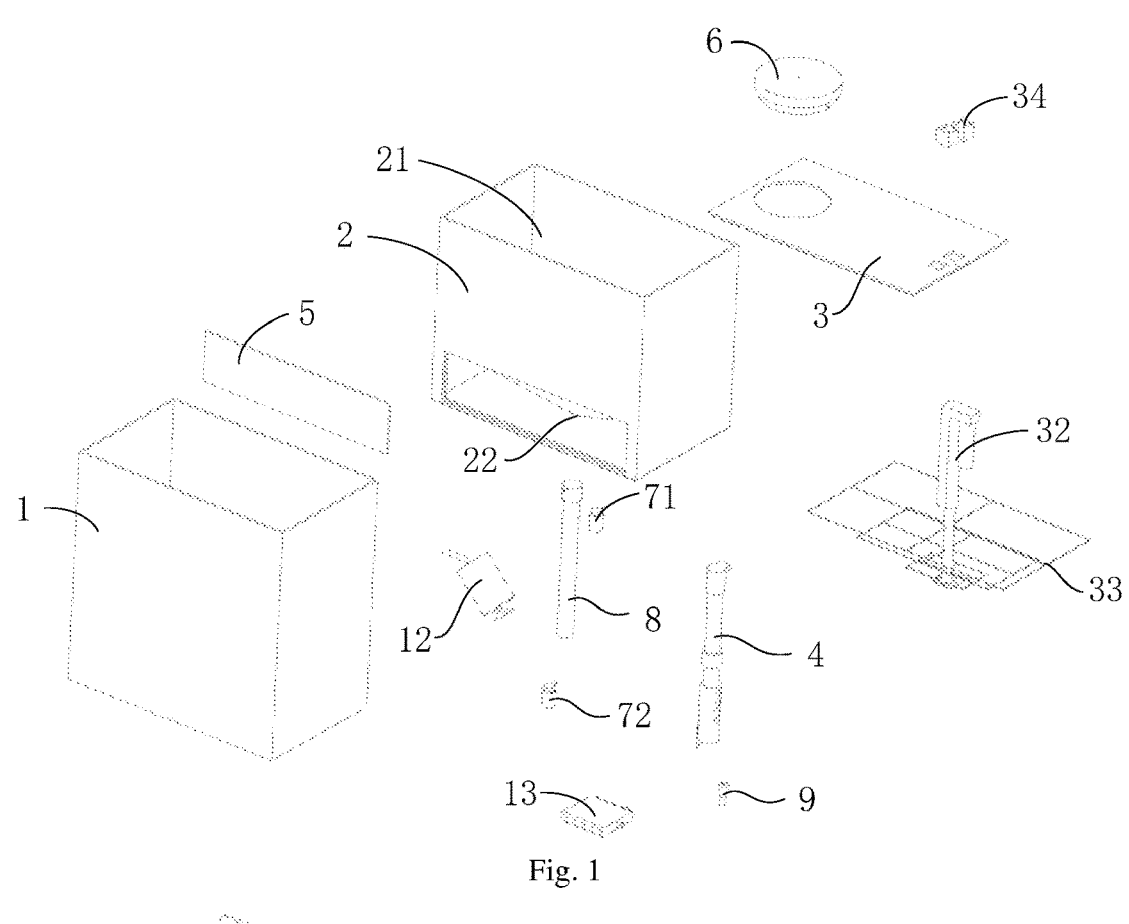
FIG. 1 is an exploded view of a solution preparation device according to an embodiment of the present application.
Figure 2:
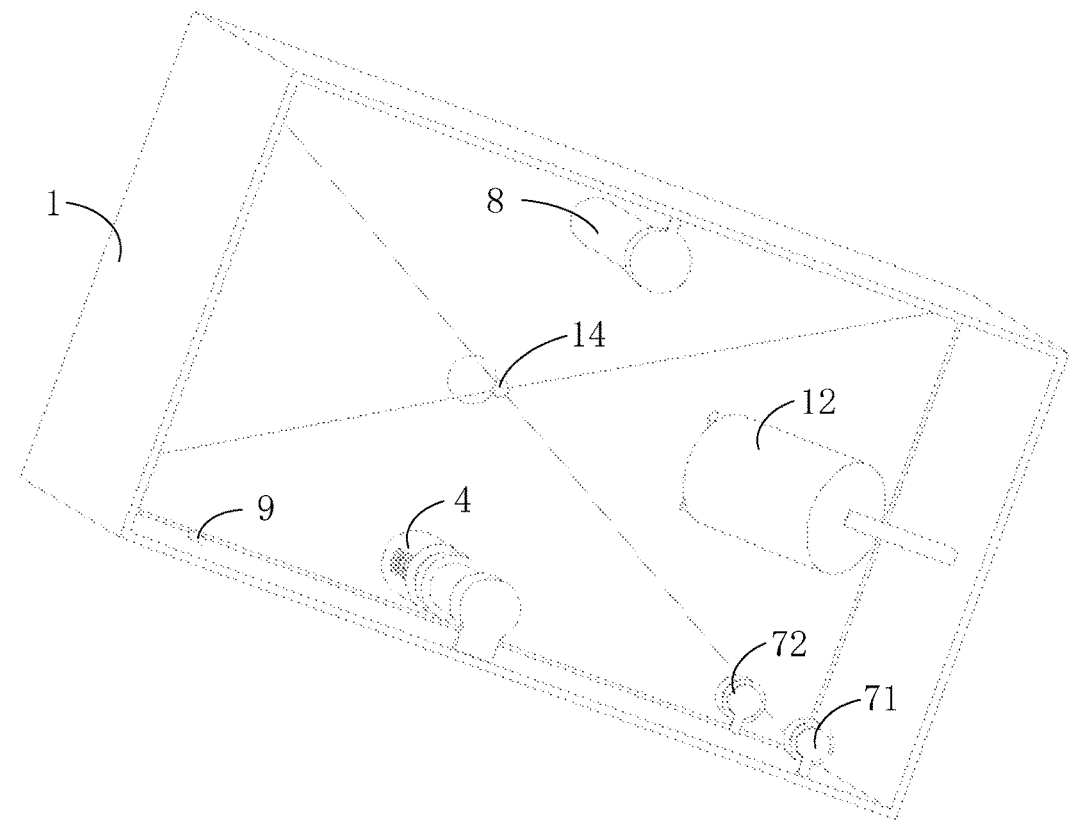
FIG. 2 is a schematic diagram illustrating an internal structure of the liquid container in FIG. 1.
Figure 3:
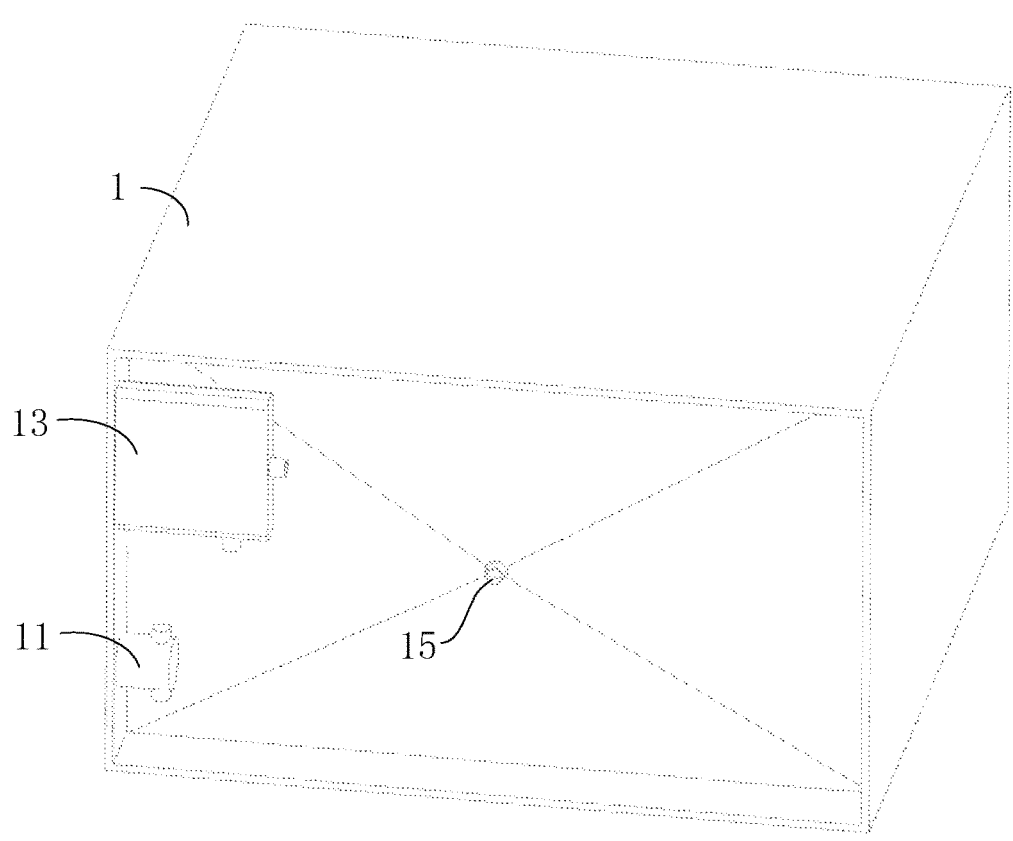
FIG. 3 is a schematic diagram illustrating an external structure of the liquid container in FIG. 1.
Figure 4:
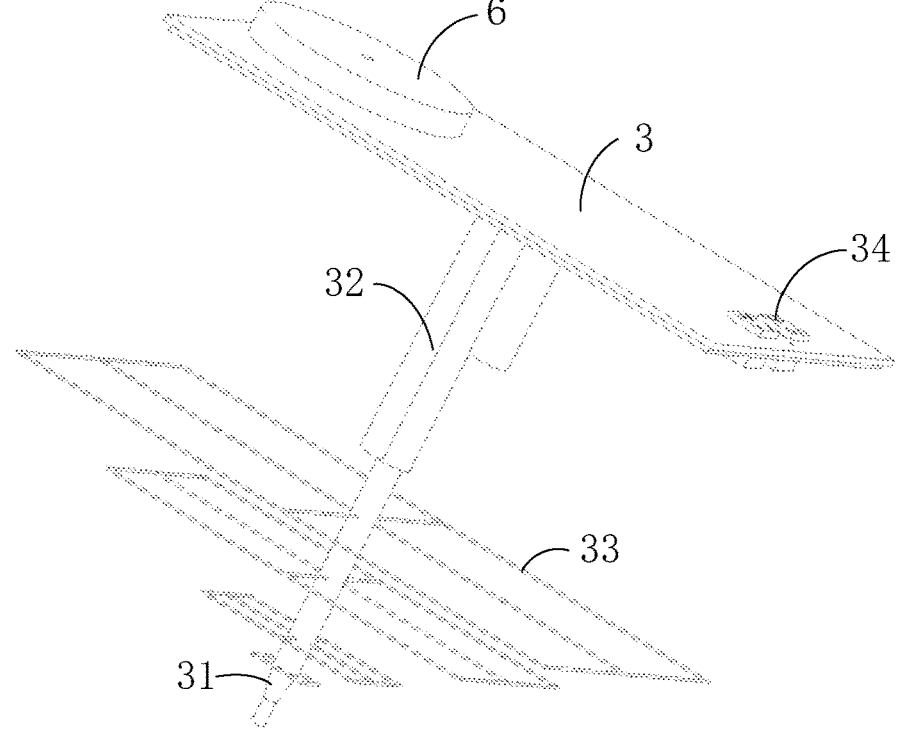
FIG. 4 is a schematic structural diagram of the upper cover in FIG. 1.

Refer to FIGS. 1-4. FIG. 1 is an exploded view of a solution preparation device according to an embodiment of the present application; FIG. 2 is a schematic diagram illustrating an internal structure of the liquid container in FIG. 1; FIG. 3 is a schematic diagram illustrating an external structure of the liquid container in FIG. 1; FIG. 4 is a schematic structural diagram of the upper cover in FIG. 1.

The embodiments of the present application provide a solution preparation device as shown in FIGS. 1-4. The solution preparation device 10 includes a liquid container 1, a powder container 2, an upper cover 3 and a controller 5. The liquid container 1 is provided with a detection element 4 for detecting a specific parameter of a solution in the liquid container 1. The powder container 2 is arranged above the liquid container 1. The upper cover 3 can be closed on the powder container 2 to form a material holding cavity 21, which is used for placing a powder. A bottom of the powder container 2 is provided with a material discharge port 22, which can be disposed between the material holding cavity 21 and the liquid container 1, and the powder in the material holding cavity 21 can enter the liquid container 1 along the material discharge port 22. The solution preparation device further includes a stopper 31 for blocking the material discharge port 22, and the controller 5 can control the stopper according to the specific parameter to realize the opening and closing of the material discharge port 22.

In detail, the solution preparation device 10 in this embodiment is used to prepare a solution with a specific parameter as a target value (hereinafter referred to as "target solution"). Specifically, when the solution is prepared, after the liquid container 1 is filled with purified water, the controller 5 controls the stopper 31 to move away from the material discharge port 22, that is, the material discharge port 22 is opened. At this time, the material holding cavity 21 is communicated with the liquid container 1, and the powder in the material holding cavity 21 can be discharged under the action of gravity, and falls into the liquid container 1 and dissolves in water. At the same time, the detection element 4 detects the specific parameter of the solution in the liquid container 1 in real time. The controller 5 monitors the specific parameter in real time and controls the stopper 31 to move to block the material discharge port 22 so as to close the material discharge port 22 when the specific parameter reaches the target value. The preparation of the target solution is completed.

Here, the target solution refers to a solution whose specific parameter reaches the target value. Specifically, the target solution has different specific parameters and target values according to different usage conditions, which is not limited herein. The detection element 4 can implement direct measurement or indirect measurement according to the specific parameters. For example in this embodiment, if the solution preparation device 10 is used to prepare the target solution used in an aquarium, the concentration and the proportion of the target solution must reach the target values, the detection element 4 may be an element that can directly detect the concentration and the proportion of the solution, and the controller 5 directly controls the opening and closing of the material discharge port 22 according to the specific parameters detected by the detection element 4. Or, the detection element 4 can be a conductivity detection element. In this case, because the proportion of the solution is related to the conductivity (non-linear correlation, and for different powders, the relationship between proportion and conductivity is also different, it needs to be determined and calculated according to the corresponding relationship stored in the controller 5), the controller 5 can calculate the proportion of the solution according to the conductivity of the solution, and decide whether to continue adding powder or water until the specific parameter reaches the target value.

The solution preparation device 10 has a simple structure and can realize automatic solution preparation without frequent manual operations. While reducing manual operations and material resources, the preparation time is reduced, the efficiency and the accuracy of preparation are improved, and the efficiency of liquid replacement in the target container 20 is improved.

In addition, the controller 5 can be connected to a user terminal through WiFi, Bluetooth, etc., so as to be monitored and controlled. And how the controller 5 calculates the concentration and the proportion of the solution according to the conductivity, how the controller 5 controls the stopper 31 according to the concentration and the proportion of the solution to realize the opening and closing of the material discharge port 22, and how the controller 5 is connected to the user terminal, all are the prior art well known to those skilled in the art, and will not be repeated herein to avoid redundancy.

In this embodiment, the number of the powder containers 2 is not limited. There can be one power container 2 for placing one kind of powder or mixture of multiple kinds of powder, or there can be two or more powder containers 2 to separately placing different kinds of powders. In addition, there are no specific requirements for the specific components of the powder, and different powders can be selected according to the specific use conditions. If the solution preparation device 10 is used to prepare a solution in an aquarium with a specific concentration and a specific proportion and there is one powder container 2, the powder is a composite salt pre-prepared in proportion, where the composite salt includes calcium chloride, magnesium chloride, sodium chloride, etc. Alternatively, there may be multiple powder containers 2 for separately placing calcium chloride, magnesium chloride, sodium chloride, etc.

In the above-mentioned embodiment, a stirring part 33 can be further provided in the material holding cavity 21 for stirring the powder in the material holding cavity 21, so as to avoid the powder in the material holding cavity 21 from agglomerating after being kept for a long time. In this way, it can be ensured that when the material discharge port 22 is in an open state, the powder can smoothly fall into the liquid container 1 along the material discharge port 22 to ensure the smooth preparation of the solution.

In the above-mentioned embodiment, the upper cover 3 is provided with a telescopic part 32, and the stopper 31 is provided at a bottom end of the telescopic part 32. The telescopic part 32 can be extended and contracted under the control of the controller 5 to drive the stopper 31 to move up and down, so as to achieve the opening and closing of the material discharge port 22. The stirring part 33 is provided at a lower part of the telescopic part 32. In other words, when the stopper 31 is separated from the material discharge port 22, the stirring part 33 starts to move, so that the powder can fall into the liquid container 1 smoothly. The stirring part 33 being arranged at the lower part of the telescopic part 32 can simplify the overall structure and reduce the space occupied by each component.

Specifically, the stirring part 33 may be a multi-layer screen arranged along a length direction of the telescopic part 32 as shown in FIG. 4. Of course, the stirring part 33 may also be provided in the structure of a paddle. The screen can avoid blocking the powder. At the same time, the cross section of the screen is smaller, and its stirring effect on the powder is more flexible.

In the above-mentioned embodiment, a moving track of the stopper 31 is parallel to an axis of the material discharge port 22, and the stopper 31 is provided with a downwardly tapered elastic tapered plug, that is, the stopper 31 has a tapered structure, which is beneficial to achieve a guiding effect when blocking the material discharge port 22 (a circular hole provided at a bottom of the powder container 2). Having elasticity enables better seal of the material discharge port 22 by the stopper 31 so as to prevent the powder from falling.

Specifically, when the telescopic part 32 is extended, the elastic tapered plug at the bottom end thereof contacts the material discharge port 22 (circular hole) at the bottom of the powder container 2, which produces a sealing effect. When the telescopic part 32 continues to extend, because the upper cover 3 and the powder container 2 are made of plastic and a certain amount of deformation can occur, the upper cover 3 and the bottom of the powder container 2 are plastically deformed, which provides a reverse force to make the bottom end of the telescopic part 32 be pressed against the circular hole at the bottom of the powder container 2, so as to further ensure the sealing effect of the elastic tapered plug.

In addition, in this embodiment, an angle between the moving track of the stopper 31 and the axis of the material discharge port 22 may be greater than 0° and less than or equal to 90°. At this time, the stopper 31 is arranged obliquely with respect to the material discharge port 22. The stopper 31 can be pushed and pulled laterally to realize the opening and closing of the material discharge port 22.

Of course, in this embodiment, a bottom of the stopper 31 which is disposed at the powder container 2 can be provided inside the above-mentioned material holding cavity 21 or at an outside of the bottom of the powder container 2, the material discharge port 22 of the powder container 2 can also be blocked. Compared with the solution in which the stopper 31 is provided at the powder container 2, the solution in which the stopper 31 is provided at the upper cover 3 can simplify the overall structure and simplify the operation procedures.

In the above-mentioned embodiment, a drying part 6 is provided in the material holding cavity 21, which can be a desiccant or a dehumidifier, etc., and is not specifically limited herein. The setting of the drying part 6 keeps the powder in the powder container 2 dry and avoids agglomeration due to moisture. Specifically, the drying part 6 can be arranged on a lower surface of the upper cover 3 or on an inner wall of the powder container 2, and there is no limitation herein.

In the above-mentioned embodiment, the bottom wall of the powder container 2 is a tapered surface that tapers downward, and the cone angle of the tapered surface is not greater than 130° to prevent powder accumulation on the edge of the material discharge port 22 in the powder container 2. Specifically, the cone angle of the tapered surface is not limited. Under normal circumstances, the powder accumulation angle is 25°. When the cone angle of the tapered surface is not greater than 130°, it can be guaranteed in most cases that the material will not accumulate on the edge of the material discharge port 22.

Further, if the bottom of the powder container 2 is a tapered surface and the stirring part 33 includes the multi-layer screen, as shown in FIG. 4, the cross-sectional area of each layer of the screen is adapted to the tapered surface, and gradually decreases along a length direction of the telescopic part 32, so as to ensure the stirring range of the stirring part 33.

In the above-mentioned embodiment, the liquid container 1 is provided with two level gauges from top to bottom, namely a first level gauge 71 and a second level gauge 72. The first level gauge 71 is located at the highest water level in the liquid container 1 and is used to remind that the water in the liquid container 1 has reached the highest water level of the liquid container 1 when the liquid container 1 is filled with water, so that the controller 5 can stop the water filling operation in time. The second level gauge 72 is located at the lowest water level in the liquid container 1 and is used to remind the completion of the discharge when the water reaches the lowest water level during the process of discharging water to the target container 20 from the liquid container 1, so that the controller 5 can stop the discharge operation in time. Of course, in this embodiment, a third level gauge can also be provided in the liquid container 1. The third level gauge is located at a working water level line in the liquid container 1 to indicate that the water level in the liquid container 1 has flooded the working parts, that is, all working parts can work normally. Here, the working parts include the detection element 4, a mixed flow pump, a temperature sensor 9 and a heating device 8 and so on. The setting of level gauges is convenient for monitoring the position of the liquid level in the liquid container 1.

In the above-mentioned embodiment, the heating device 8 and the temperature sensor 9 are provided in the liquid container 1. At different temperatures, the target values of specific parameters of the same solution are different or the calculation methods of specific parameters (such as proportion/conductivity) are different. In this embodiment, the temperature sensor 9 is used to detect a temperature of the solution in the liquid container 1, and the controller 5 controls the heating device 8 to heat the solution based on the detected temperature, so as to ensure that the temperature of the solution can be maintained in a relatively stable temperature range, thereby ensuring the accuracy of the measurement. At the same time, in order to further improve the accuracy of the measurement, the controller 5 can also compensate the measurement result according to the temperature change. The specific compensation relationship can be summarized by multiple experiments, which is not limited herein.

In the above-mentioned embodiment, the liquid container 1 is provided with a flow pump 12, and a discharging pump 13 is provided at a water outlet 15 of the liquid container 1. In the process of preparing the solution, the powder falls freely from the material discharge port 22 of the powder container 2 into the liquid container 1. At this time, the flow pump 12 accelerates the flow of the liquid in the liquid container 1 to accelerate the dissolution of the powder, thereby ensuring the accuracy of the detection result of the detection element and avoiding the situation that the final power is added too much because the powder falling into the liquid container 1 is not dissolved in time. After the preparation of the target solution is completed, the solution is discharged from the water outlet 15 into the target container 20 by the discharging pump 13.

In the above-mentioned embodiment, a power supply socket 34 is further provided at an outer side of the upper cover 3. The power supply socket 34 is signally connected to the controller 5 which can control the power supply socket 34 to be powered on and off. In detail, the power supply socket 34 is used to supply power to external devices of the target container 20 to prevent the use of the external devices from being impacted during the water filling or discharging process of the target container 20. For example, if the power supply socket is used to supply power to a heater of the target container 20 (that is, the above-mentioned external device is a heater), when the water exchange operation is performed, the controller 5 controls the power supply socket 34 to power off, so that the heater in the target container 20 stops working to prevent the heater from being exposed and burning dry when the water level is too low during discharging. This process does not require manual operations and has a high degree of automation. How the controller 5 controls the power supply socket 34 to be powered on or off according to the working state of the discharging pump 13 is a well-known prior art to those skilled in the art, and will not be repeated herein to avoid redundancy.

In the above-mentioned embodiment, the liquid container 1 is provided with a flow meter 11. When the flow meter 11 detects that the amount of water in the liquid container 1 reaches a preset amount, the controller 5 controls a water inlet 14 to close. In this embodiment, the water inlet 14 is actually the same part as the water outlet 15 although a different reference sign is used to help understanding. Here, the preset water amount is determined according to the amount of solution required by the target container 20, which can achieve precise preparation and avoid waste. In addition, the controller 5 can calculate the remaining amount of powder in the powder container 2 according to the number of solution preparations, the target value, and the flow rate of powder in each discharging, so that the operator can replenish the powder in the powder container 2 in time.

In addition, in this embodiment, the liquid container 1 is also provided with a breathing hole to prevent the internal air seal from affecting the water intake and discharging in the liquid container 1. Specifically, the breathing hole can be located at a top side wall of the liquid container 1, or at a bottom end of the powder container 2, and the breathing hole does not communicate with the material holding cavity 21.

Refer to FIGS. 5-7. FIG. 5 is a schematic structural diagram of a solution replacement system according to an embodiment of the present application; FIG. 6 is a block diagram of a solution replacement method according to an embodiment of the present application; and FIG. 7 is a detailed block diagram of a solution replacement method according to an embodiment of the present application.

The embodiments of the present application further provide a solution replacement system. As shown in FIG. 5, the solution replacement system includes a target container 20, a water source 30, a water pump 40, a sewage treatment device 50, a washing device 60, and the solution preparation device 10 described above. An upstream of the water pump 40 is communicated with the target container 20 and the water outlet 15 of the liquid container 1 of the solution preparation device 10 through a first pipeline 701 and a second pipeline 702, respectively. A downstream of the water pump 40 is communicated with the target container 20, the sewage treatment device 50 and the washing device 60 through a third pipeline 703, a fourth pipeline 704 and a fifth pipeline 705, respectively. The water source 30 is communicated with the liquid container through a sixth pipeline 706. Here, the water source can be a water purifier, a bucket for storing purified water, etc., which is not limited herein.

Each pipeline (including the first pipeline 701, the second pipeline 702, the third pipeline 703, the fourth pipeline 704, the fifth pipeline 705 and the sixth pipeline 706) is respectively provided with a solenoid valve 80 for controlling the on-off of each pipeline, which facilitates automatic operations.

In addition, the embodiments of the present application further provide a solution replacement method. As shown in FIG. 6, the solution replacement method includes the following steps:

S1: discharging an original solution in a target container 20, and introducing purified water into a liquid container 1 to a preset amount of water;

S2: opening a material discharge port 22 of a powder container 2, adding a powder into the liquid container 1, and when a detection element detects that a specific parameter of a solution in the liquid container 1 reaches a target value, closing the material discharge port 22 of the powder container 2 to obtain a target solution;

S3: opening a water outlet 15 of the liquid container 1, discharging the target solution into the target container 20; and S4: cleaning inner walls of the liquid container 1.

Specifically, when the liquid in the target container 20 needs to be replaced, the original liquid in the target container 20 is discharged first, meanwhile the solenoid valves 80 of the first pipeline 701 and the fourth pipeline 704 are turned on, the water pump 40 is activated to discharge the original liquid in the target container 20 to the sewage treatment device 50 along the first pipeline 701 and the fourth pipeline 704. During this process, the original solution in the target container 20 can be discharged completely. Alternatively, a part of the original solution can be kept in the target container 20 by using a level gauge or flow meter 11 in some cases, for example when there is fish in the aquarium. At the same time, the solenoid valve 80 of the sixth pipeline 706 is turned on, so that the water source 30 supplies water to the liquid container 1 of the solution preparation device 10 through the sixth pipeline 706. Then the solenoid valve 80 of the sixth pipeline 706 is turned off when the amount of the supplied water reaches a preset amount of water (according to the amount of water required by the target container 20).

Then the material discharge port 22 of the powder container 2 of the solution preparation device 10 is opened, so that the powder in the powder container 2 falls into the liquid container 1 along the material discharge port 22, and at the same time, the specific parameter of the solution in the liquid container 1 is measured by the detection element 4 in real time (directly or indirectly). When the specific parameter reaches the target value, the material discharge port 22 of the powder container 2 is closed, and the preparation of the target solution is completed.

Then the solenoid valves 80 of the second pipeline 702 and the third pipeline 703 are turned on at the same time, the target solution in the liquid container 1 can be discharged into the target container 20 along the second pipeline 702 and the third pipeline 703 under the action of the water pump 40, so as to realize the replacement of the liquid in the target container 20.

Finally, the inner walls of the liquid container 1 are cleaned to ensure cleanliness of the inside of the liquid container 1, so as to prevent affecting different solutions prepared in the future.

In the solution replacement system according to the above-mentioned embodiments, the downstream of the water pump 40 communicates with a water inlet 14 of the liquid container 1 through the seventh pipeline 707, and the seventh pipeline 707 is also provided with a solenoid valve 80. Correspondingly, in the above-mentioned solution replacement method, before step S1, it further includes step S01: introducing the original solution in the target container 20 into the liquid container 1, detecting the specific parameter of the original solution through the detection element and using it as the aforementioned target value, and then discharging the original solution in the liquid container 1. And the above-mentioned steps S1-S4 are implemented to prepare the solution and replace the solution in the targe container 20.

That is, in this embodiment, the controller 5 determines and stores the target value according to the specific parameters of the original solution, and then controls the solution preparation device 10 to prepare the target solution according to the target value, so as to improve the accuracy of the configuration of the specific target solution. At this time, the original solution in the target container 20 is divided into two parts, one part is introduced into the liquid container 1 to be detected so as to determine the target value of the specific parameter, and the other part is introduced into the sewage treatment device 50 for processing. Of course, in this embodiment, the target value of the specific parameter of the target solution can also be set according to calculations and other methods. Specifically, it can be set according to the original solution in the target container 20. It is determined whether the specific parameter will change after the original solution is prepared until the original solution is to be replaced. If it changes, there is no need to introduce the original solution into the liquid container 1 for detection before the solution is prepared, that is, there is no need to perform Step S01. If the specific parameter does not change, the target value of the specific parameter can be determined by detecting the original solution or by calculation, which is not limited herein.

In the above-mentioned embodiment, between Step S1 and Step S2, as shown in FIG. 7, Step S11 is further included: heating the purified water in the liquid container 1 to a preset temperature. Here, the preset temperature is the temperature required for the liquid in the target container 20, that is, the liquid prepared by the solution preparation device directly meets the requirements of the solution in the target container 20, and there is no need to adjust the temperature of the prepared solution again. If the target container 20 is an aquarium and there are living creatures in the aquarium, directly introducing the prepared solution into the aquarium will not cause the living creatures inside to be uncomfortable due to the temperature difference.

Further, in the above-mentioned embodiment, as shown in FIG. 7, before Step S1, Step S02 is further included: introducing the original solution in the target container into the liquid container, detecting the specific parameter of the original solution through the detection element and using it as the target value, meanwhile detecting the temperature of the original solution and using it as the above-mentioned preset temperature, and then discharging the original solution in the liquid container. That is, the controller 5 determines and stores the target value according to the specific parameters of the original solution. At the same time, the controller 5 also determines and stores the preset temperature according to the temperature of the original solution, and then the purified water in the liquid container 1 is heated by the heating device 8 and the target solution is prepared according to the target value, which ensures that the temperature of the prepared solution is the required temperature of the liquid in the target container 20 while improving the accuracy of the configuration of the specific target solution.

In the above-mentioned embodiment, the cleaning of the inner walls of the liquid container 1 may specifically include the following steps:

S41: introducing purified water into the liquid container 1, and keeping the water in the liquid container 1 flowing for at least 10 minutes;

S42: discharging the water in the liquid container 1;

S43: introducing purified water into the liquid container 1, and introducing the purified water in the liquid container 1 into the washing device 60;

S44: discharging the water in the liquid container 1 after the washing device 60 washes inner walls of the liquid container 1; and S45: repeating Steps S41-S44 at least twice.

The specific cleaning process is as follows: turning the solenoid valve 80 of the sixth pipeline 706 to allow purified water to flow into the liquid container 1 to clean inside of the liquid container 1 (if the liquid container 1 is equipped with a flow pump 12, turn on the flow pump 12), then simultaneously turning on the solenoid valves 80 of the second pipeline 702 and the fourth pipeline 704, turning on the water pump 40 so that the cleaning liquid in the liquid container 1 is discharged to the sewage treatment device 50 along the second pipeline 702 and the fourth pipeline 704; then turning on the solenoid valves 80 of the second pipeline 702, the fifth pipeline 705, and the sixth pipeline 706 to allow the purified water to enter the liquid container 1 and then enter the washing device 60 under the action of the water pump 40, and washing the inner walls of the liquid container 1 by the washing device 60; and then turning on the solenoid valves 80 of the second pipeline 702 and the fourth pipeline 704 at the same time, discharging the water in the liquid container 1 to the sewage treatment device 50. The above-mentioned washing operations are repeated at least twice to ensure that the inner walls of the liquid container 1 are cleaned.

The above are only the preferred embodiments of the present application. It should be pointed out that for those of ordinary skill in the art, without departing from the principle of the present application, several improvements and modifications can be made, and these improvements and modifications should also be considered falling into the protection scope of the present application.

What is claimed is:

1. A solution preparation device, comprising a liquid container, a powder container, an upper cover and a controller; wherein the liquid container is provided with a detection element for detecting a specific parameter of a solution;

the powder container is arranged above the liquid container, the upper cover covers a top end of the powder container to form a material holding cavity for placing a powder, a bottom end of the powder container is provided with a material discharge port through which the powder in the material holding cavity enters the liquid container, and the upper cover is provided with a stopper for blocking the material discharge port;

the controller controls the stopper to move up and down according to the specific parameter to realize opening and closing of the material discharge port;

wherein the solution preparation device further comprises a stirring part provided in the material holding cavity for stirring the powder in the material holding cavity;

the upper cover is provided with a telescopic part comprising a shaft, the stopper is provided at a bottom end of the shaft, and the stirring part is provided at a lower part of the shaft; and the stirring part comprises a multi-layer screen arranged along a length direction of the shaft such that the stirring part moves up and down along with the stopper.

2. The solution preparation device according to claim 1, wherein a moving track of the stopper is parallel to an axis of the material discharge port, and the stopper is provided with a downwardly tapered elastic tapered plug.

3. The solution preparation device according to claim 1, wherein a drying part is provided in the material holding cavity.

4. The solution preparation device according to claim 1, wherein a bottom wall of the powder container is a tapered surface that tapers downwards, and a cone angle of the tapered surface is not greater than 130°.

5. The solution preparation device according to claim 1, wherein the liquid container is provided with a first level gauge and a second level gauge;

the first liquid level gauge is arranged at a highest water level line in the liquid container;

the second liquid level gauge is arranged at a lowest water level line in the liquid container.

6. The solution preparation device according to claim 1, wherein the liquid container is provided with a heating device and a temperature sensor.

7. The solution preparation device according to claim 1, wherein the liquid container is provided with a flow pump, and a discharging pump is provided at a water outlet of the liquid container.

8. The solution preparation device according to claim 1, wherein a power supply socket is further provided at an outside of the upper cover, and the controller controls turning on and turning off of the power supply socket; the power supply socket is configured to supply power to a heater of a target container, when a water exchange operation is performed, the controller controls the power supply socket to power off, so that the heater in the target container stops working to prevent the heater from being uncovered when a water level is too low during discharging.

9. The solution preparation device according to claim 1, wherein the liquid container is provided with a flow meter, and when the flow meter detects an amount of water entering the liquid container reaches a preset amount of water, the controller controls a water inlet of the liquid container to close.

10. A solution replacement system, comprising a target container, a water source, a water pump, a sewage treatment device, a washing device and the solution preparation device according to claim 1; wherein an upstream of the water pump is communicated with the target container and a water outlet of the liquid container of the solution preparation device through a first pipeline and a second pipeline, respectively;

a downstream of the water pump is communicated with the target container, the sewage treatment device and the washing device through a third pipeline, a fourth pipeline and a fifth pipeline, respectively;

the water source is communicated with the liquid container through a sixth pipeline;

each pipeline is respectively provided with a solenoid valve.

11. The solution replacement system according to claim 10, wherein the downstream of the water pump is communicated with a water inlet of the liquid container through a seventh pipeline, and the seventh pipeline is provided with a solenoid valve.

12. A solution replacement method using a solution replacement system according to claim 10, comprising following steps:

S1: discharging an original solution in the target container, and introducing purified water into the liquid container to a preset amount of water;

S2: opening the material discharge port of the powder container, adding a powder into the liquid container, and when the detection element detects that the specific parameter of a solution in the liquid container reaches a target value, closing the material discharge port of the powder container to obtain a target solution;

S3: opening the water outlet of the liquid container, discharging the target solution into the target container; and S4: cleaning inner walls of the liquid container.

13. The solution replacement method according to claim 12, further comprising Step S01 before Step S1: introducing the original solution in the target container into the liquid container, detecting the specific parameter of the original solution by the detection element and using a detected specific parameter as the target value, then discharging the original solution in the liquid container.

14. The solution replacement method according claim 12, wherein Step S4 comprises:

S41: introducing purified water into the liquid container, and keeping the water in the liquid container flowing for at least 10 minutes;

S42: discharging the water in the liquid container;

S43: introducing purified water into the liquid container, and introducing the purified water in the liquid container into a washing device;

S44: discharging the water in the liquid container after the washing device washes the inner walls of the liquid container; and S45: repeating Steps S41-S44 at least twice.

15. The solution replacement method according to claim 12, further comprising Step S11 between Step S1 and Step S2: heating the purified water in the liquid container to a preset temperature.

16. The solution replacement method according to claim 15, further comprising Step S02 before Step S1: introducing the original solution in the target container into the liquid container, detecting the specific parameter of the original solution by the detection element and using a detected specific parameter as the target value, meanwhile detecting a temperature of the original solution by a temperature detection element and using a detected temperature as a preset temperature, then discharging the original solution in the liquid container.

* * * * *